United States Patent [19]

Hagar et al.

[11] Patent Number: 4,791,980

[45] Date of Patent: Dec. 20, 1988

[54] SEALING ARRANGEMENT FOR AIR PREHEATER

[75] Inventors: Donald K. Hagar, Emmaus; Curtis V. Kennedy, Whitehall, both of Pa.; Garnold Townsend, Waterford, Ohio

[73] Assignee: Eagleair, Inc., Bethlehem, Pa.

[21] Appl. No.: 33,779

[22] Filed: Apr. 3, 1987

Related U.S. Application Data

[62] Division of Ser. No. 657,010, Oct. 2, 1984, Pat. No. 4,673,026.

[51] Int. Cl.⁴ .............................................. F28D 19/04
[52] U.S. Cl. ...................................... 165/9; 277/81 R
[58] Field of Search ...................... 165/9, 7; 277/81 R

[56] References Cited

U.S. PATENT DOCUMENTS

| 1,746,598 | 2/1930 | Ljungstrom | 165/9 |
| 2,549,583 | 4/1951 | Eckersley | 165/9 |

FOREIGN PATENT DOCUMENTS

149059  11/1979  Japan ..................... 165/9

*Primary Examiner*—Albert W. Davis, Jr.
*Attorney, Agent, or Firm*—Foley & Lardner, Schwartz, Jeffery, Schwaab, Mack, Blumenthal & Evans

[57] ABSTRACT

A sealing arrangement for an air preheater for a fuel burning device includes both radial and circumferential seals. The radial seals include a set of flexible, foil-like metal sealing strips coupled to semi-rigid radial seal plates. The semi-rigid radial seal plates, in turn, are coupled to diaphragm members which divide a generally cylindrical drum of the air preheater into sectors, each sector containing a set of heat exchanger elements, such as parallel plates or fins. To effect sealing, the foil-like metal radial sealing strips will engage and wipe across sector plates on a housing surrounding the drum. The radial sealing strips are completely unobstructed from cantilevered yielding movement in a trailing direction to the full extent that the flexure characteristics of the radial sealing strips themselves permit. the circumferential sealing strips are also constructed of a flexible, thin, foil-like metal material. These circumferential strips are coupled to circumferential seal plates which, in turn, are connected to the drum of the air preheater adjacent the outer circumferential edges of the drum. The circumferential sealing strips yieldingly engage annular surfaces of the housing surrounding the drum to effect sealing between the drum and the housing. Each circumferential sealing strip includes a sharp bend adjacent its free distal edge to direct the free distal edge toward engagement with an annular sealing surface of the housing.

16 Claims, 7 Drawing Sheets

SEALING ARRANGEMENT FOR AIR PREHEATER

This application is a division, of application Ser. No. 657,010, filed Oct. 2, 1984, U.S. Pat. No. 4,673,026.

BACKGROUND OF THE INVENTION

1. Technical Field of the Disclosure

The present invention relates to regenerative air preheaters and particularly to improved radial and circumferential sealing arrangements for effecting seals between the relatively movable portions of the air preheater, namely, the drum containing the matrix of heat exchanging elements and the surrounding housing.

2. Description of the Prior Art

It is typical in fuel burning installations or devices, such as electrical power generating plants, to use regenerative air preheaters for heating the intake air to improve the efficiency of the fuel burning operation. These air preheaters typically include two major components, namely, a generally cylindrical drum having a matrix of heat exchanging elements therein and a surrounding housing having a generally cylindrical opening therein. One type of preheater has a stationary drum and a movable housing surrounding the drum. However, the most commonly used preheaters are those of the Ljungtrom type in which the drum is a cylindrical rotor containing metallic heat transfer plates, the rotor being movable with respect to a surrounding stationary housing. As the rotor turns, the heat transfer plates are first exposed to hot discharge gases, and these heated plates then move into the air intake passage to heat the incoming air. The housing surrounding the drum includes sector plates which divide the housing into an air intake half and gas discharge half. In an attempt to reduce the mingling of the two fluids, the drum is typically provided with radially extending seal plates that are intended to pass closely by the sector plates with only a small clearance. Similarly, in a further attempt to reduce mingling of fluids and to reduce the bypassing of air and gas around the periphery of the drum, it is also known to provide circumferential seal plates. Again, these seal plates are intended to pass closely by an annular member on the housing with a small clearance. Also, axial seals between the circumferential seal plates have been used in an apparent effort to reduce leakage which still occurs when circumferential seal plates are used.

A major problem with the foregoing sealing arrangement is that it depends on achieving small, constant and predictable clearances between the seal plates and adjacent surfaces. Such clearances are difficult to attain even in a newly manufactured air preheater, and are particularly difficult to maintain in an air preheater that is in service. Air preheaters, when in service, are subject to extremes in temperature and a very hostile environment Factors such as wear, distortion of parts due to temperature differentials, normal dimensional changes due to heating and cooling, lack of flatness in the sector plates, out of roundness of the drum and/or adjacent housing portion, and various other factors contribute, in practice, to wide variation in the clearances between moving parts Excessive clearances of three-quarters of an inch have been known as well as a complete lack of clearance in which there is an unintentional clashing of the metal seal plates with the adjacent sealing surfaces. These problems are further aggravated by the hostile environment to which an air preheater is subjected. The dirty, soot- and acid-laden discharge gas which passes through the air preheater results in soot buildup, corrosion, and wear, all of which contributes to irregularities in the relatively movable parts. The irregularities, of course, lead to sealing difficulties.

SUMMARY

It is an object of the present invention to overcome the foregoing drawbacks and problems.

It is a related object of the invention to provide a sealing arrangement for an air preheater which accommodates wide variations in clearances between the relatively moving parts of the air preheater, such variations including a complete lack of clearance.

It is a further object of the present invention to effect radial and circumferential sealing of an air preheater in a manner which will accommodate considerable variation in the clearance or lack thereof between the circumferential seal plates of the drum and the adjacent annular sealing surface of the housing, on the one hand, and between the radial seal plates at the ends of the drum and the sector plates of the housing, on the other hand.

It is also an object of the present invention to provide a sealing arrangement for an air preheater which can accommodate growth and shrinkage of parts due to heating and cooling which can accommodate highly corrosive fluids without loss of sealing effect and which can accommodate irregularities in the sealing surfaces and in the elements to which the seals are attached.

It is a further object of the invention to provide a sealing arrangement for an air preheater in which the need for any axial seals between the drum and surrounding housing is eliminated.

It is yet another object of the present invention to provide a sealing arrangement for an air preheater which is highly effective and which reduces mingling of fluids and leakage around the drum to a minimum to thereto render the air preheater and thus the fuel burning operation highly efficient.

It is a further object of the invention to provide a sealing arrangement for an air preheater which achieves demonstrable fuel savings as a result of improved efficiency in the exchange of heat between the discharge gases and intake air of the fuel burning installation.

It is also an object of the present invention to provide a sealing arrangement for an air preheater which is simple in construction and economical in cost.

It is still another object of the present invention to provide a sealing arrangement for an air preheater which can be readily installed in an existing or commercially available air preheater in a very simple manner with only a minimum of modification.

It is also an object of the invention to provide a sealing arrangement for an air preheater in which a radial sealing strip is completely unobstructed from yielding movement in a trailing direction.

It is a further object of the invention to provide a sealing arrangement for an air preheater in which a distal end of a circumferential seal is directed toward face-to-face confronting relationship with an associated annular sealing surface.

These and other objects, advantages, and aspects of the present invention will be more apparent from the following Detailed Description and claims, with reference to the accompanying drawings in which like elements or features bear like reference numerals.

DETAILED DESCRIPTION

Figure 1:
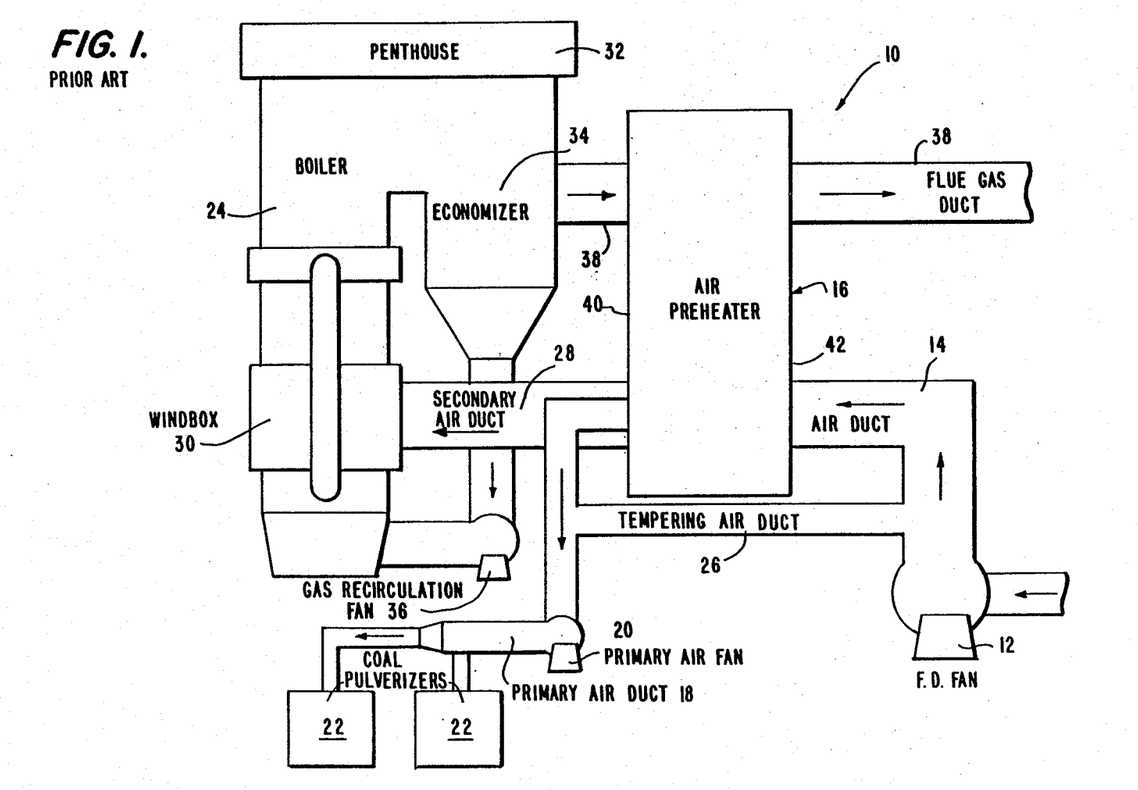
FIG. 1 is a schematic illustration of a fuel burning facility showing the environment for the air preheater of the type to which the present invention is directed.

FIG. 1 depicts a fuel burning facility or device generally referred to by reference numeral 10 Fuel burning facility 10 as shown in FIG. 1 is of a type typically used in power plants for burning pulverized coal to produce steam which, in turn, will drive turbines to produce electricity. Intake air is fed into fuel burning facility 10 by a fan 12 via intake air duct or passage 14. This intake air is fed into one side of an air preheater generally referred to by reference character 16. Air preheater 16 utilizes discharge flue gases to preheat the intake air flowing through duct 14, which preheating, in turn, increases the efficiency of the fuel burning operation.

Downstream of the air preheater 16, primary air for entraining pulverized coal is tapped off from air duct 14 both downstream of the air preheater and also via a tempering air duct 26 which bypasses the air preheater. Primary air passes through primary air duct 18, and its flow is boosted by a primary air fan 20 which feeds the primary air to coal pulverizers 22. The primary air entrains the pulverized coal and feeds it to the boiler 24.

Meanwhile, the remaining air which passes through the air preheater 16 continues on through the secondary air duct or passage 28 and then into the wind box 30 This is secondary air and is the air which supports combustion. The secondary air is fed to the boiler along with the pulverized coal entrained in primary air.

Above the boiler 24 is a penthouse 32, and downstream of the boiler is an economizer 34 which effects recirculation of gases via gas recirculation fan 36. The remainder of the flue gases are discharged via flue gas duct or passage 38 which passes through another side of the air preheater 16 for preheating the cold intake air flowing in through air duct 14.

It will be noted that, as seen in FIG. 1, one-half of the right-hand end of the air preheater receives cold intake air and another half of the right-hand end discharges flue gases from which heat has been extracted. That is, the flue gas being discharged is cooled flue gas. Since both the air flowing into and the gas flowing out of the right-hand end of air preheater 16 (as viewed in FIG. 1) is relatively cool, that end is referred to as the cold end 42. By the same token, intake air flowing out of the left-hand end of the air preheater (as viewed in FIG. 1) will be relatively hot, as will the flue gases flowing into the left-hand end of the air preheater (as viewed in FIG. 1). Accordingly, the left-hand end (as viewed in FIG. 1) is referred to as the hot end 40.

Figure 2:
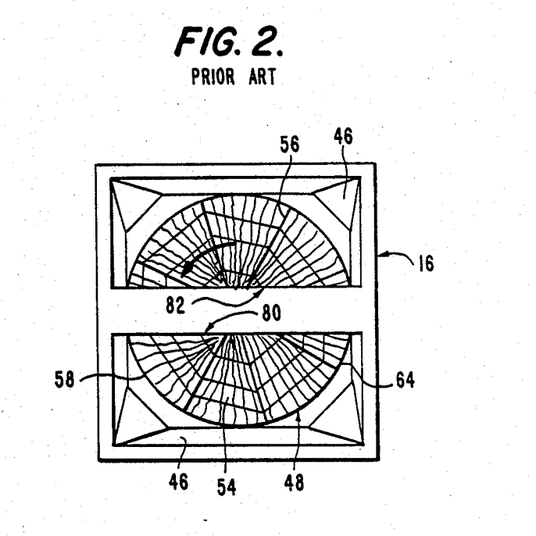
FIG. 2 is a plan view of such an air preheater.

FIGS. 2-6 depict details of a conventional air preheater 16, while FIGS. 7-14 depict improvements thereto which are the subject of the present invention. Referring specifically to FIG. 2, the main portions of air preheater 16 include a housing 46 and a cylindrical drum 48 in the housing. Housing 46 surrounds drum 48. Housing 46 and drum 48 are movable relative to each other. In the specific embodiment of the air preheater shown and described herein, housing 46 is stationary and drum 48 rotates within the housing. Another type of air preheater is known, however, in which just the opposite is the case. Specifically, the drum is stationary and the housing rotates with respect to the drum. This latter type of air preheater is known as a stationary matrix air preheater. The present invention, as illustrated, described and claimed herein, is equally applicable to both an air preheater having a rotating drum, as specifically disclosed, as well as to a stationary matrix air preheater.

Figure 3:
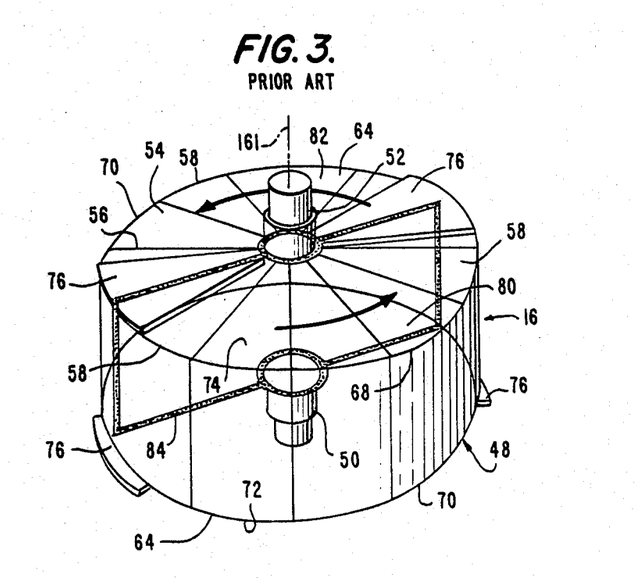
FIG. 3 is a schematic isometric view of the drum of the air preheater also showing the sector plates of the housing.

Drum 48 includes a rotor post or axle 49 (FIG. 5) journaled in a lower bearing assembly 50 and an upper trunnion and bearing assembly 52 sealed by a rotor post seal 53 (FIG. 3). Drum 48 includes sets of heat exchanging elements 54 therein. Heat exchanging elements 54 take the form of metallic heat transfer plates 16 normally having a corrugated configuration and maintained in spaced relation to provide passages therebetween for the flow of gas and air axially of the drum 48. Drum 48 also includes a plurality of radially extending diaphragms 56 which divide drum 48 into sectors 58, each sector containing a set of heat exchanging elements 54. Each diaphragm 56 includes a diaphragm member 60 in the form of a radially extending flat metal plate having radial edges 61 adjacent the hot end 40 of the air preheater 16 and radial edges 62 adjacent the cold end 42 thereof. Further, the cylindrical drum has a pair of oppositely disposed circular ends 64 adjacent both the hot and cold ends 40, 42 of the air preheater, each circular end being defined by a circular edge 70 of the drum. The circular ends and circular edges 64, 70 define a hot end 72 and cold end 74 of the drum corresponding, respectively, to the hot end 40 and cold end 42 of the air preheater 16. Of course, the hot end 72 is the end into which passes hot discharge flue gas to be subjected to heat extraction. Of course, too, the hot end 72 is that end from which passes intake air which has been preheated. Likewise, the cold end 74 of drum 48 is that end into which passes intake air for the fuel burning facility, which intake air is to be preheated. Finally, the cold end 74 of drum 48 is also that end from which passes discharge gas from the fuel burning facility, which discharge gas has been subject to heat extraction and thus cooled.

The housing includes a plurality of sector plates 76, each sector plate having a sealing surface 78 which faces toward the drum 48. Sector plates 76 divide the housing into an air intake half 80 and a gas discharge half 82. The plane 84 representing the boundary between these two halves, 80, 82 is shown in FIG. 3. As is particularly apparent from FIG. 3, there is one pair of sector plates disposed adjacent the hot end 72 of drum 48 in face-to-face relationship with hot end 72 and another pair of sector plates 76 disposed adjacent the cold end 74 of drum 48 in face-to-face relationship with cold end 48. Each sector plate 76 corresponds in configuration to a sector 58 of the drum.

In addition to the four sector plates specifically referred to and shown herein, there may be additional sector plates as well. For instance, there may be a pair of oppositely disposed sector plates at the hot and cold ends which are axially aligned with each other and which are disposed at the air intake half 80 of the air preheater to divide the air intake half into one relatively small portion for primary air and another relatively larger portion for secondary air.

Figure 7:
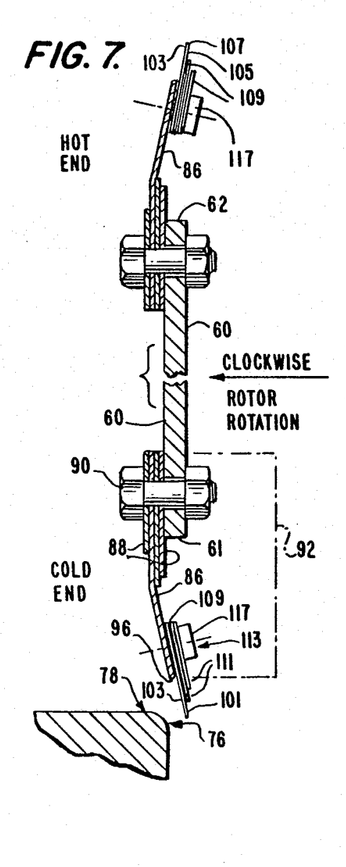
FIGS. 7 and 8 are fragmentary sectional views of a radial sealing arrangement according to the present invention.
Figures 8, 10, 13:
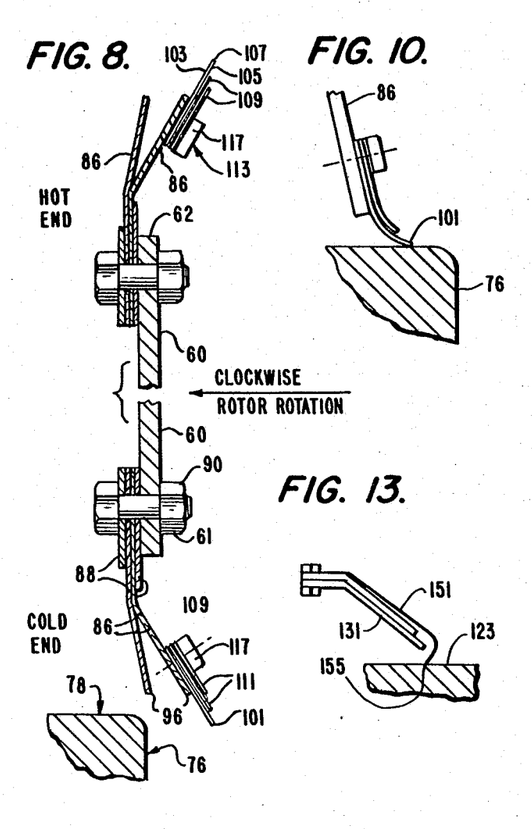
FIGS. 10 and 11 are fragmentary views, partly in section, of a radial seal arrangement according to the present invention showing various conditions of bending of sealing strips during use.
FIGS. 13 and 14 are fragmentary views, partly in section, of a circumferential seal arrangement according to the present invention showing various conditions of bending of sealing strips during use.

Diaphragms 56 of drum 48 include a set of semirigid radial seal plates coupled with diaphragm members 60 to extend lengthwise along diaphragm members 60, specifically, along their radial edges 61, 62 at the hot and cold ends 72, 74 of drum 48. Radial seal plates 86 are rigidly attached to diaphragm members 60 by holding members 88 and secured by fasteners 90. As shown in FIG. 7, there may be either a single radial seal plate 86 extending generally radially outwardly from the edges 61, 62 of diaphragm member 60 (but at a slight incline to diaphragm member 60) or, as shown in FIG. 8, there may be a pair of radial seal plates 86 extending radially outwardly from diaphragm member 60 at different inclines with respect thereto.

Figure 5:
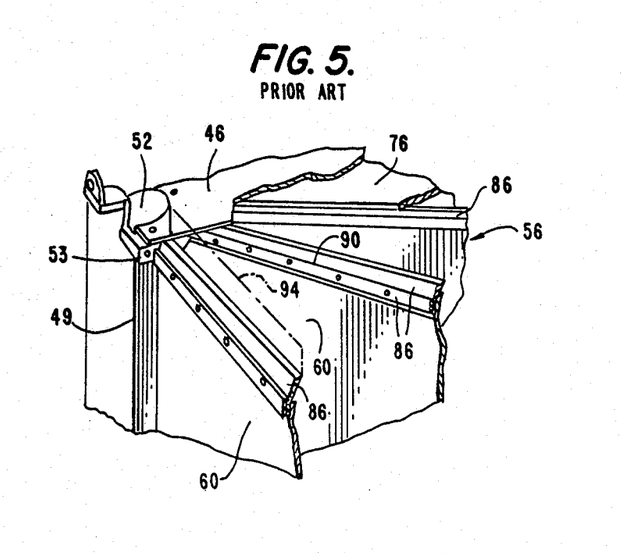
FIG. 5 is a fragmentary isometric view showing the sectors of the drum of the air preheater with the known outwardly extending seal plates.

Radial seal plates 86 are fixedly and rigidly attached to diaphragm member 60 by holding members 88 secured by fasteners 90. Each radial seal plate 86 has a width 92 (FIGS. 6, 7 and 9) extending normal to its length 94 (FIG. 5). Aside from their previously described radial extension along the diaphragm members 60, the radial seal plates 86 also extend generally axially from the drum in the direction of their widths, each radial seal plate having an outer radially extending edge 96 most remote from the drum 48. As already alluded to, reference to the radial seal plates 86 extending "axially" from the diaphragm member 60 is not meant to imply that the radial seal plates are necessarily in the same or parallel plane as the directly radially extending diaphragm members 60. Rather, "radially" in this context simply means that there is a significant radial component to the direction of extension of the radial seal plates 86. It will be apparent from the drawings, particularly FIGS. 7, 8, 9, 10 an 11, that there is also a tangential component to the outward extention of the radial seal plates 86, inasmuch as the seal plates 86 are inclined with respect to a plane which would be coincident with or parallel to the directly radially extending diaphragm member 60. The radial seal plates 86 are of such rigidity so as not to normally yield during operation of the air preheater 16 but so as to yield to a limited extent should the radial seal plates 86 and sector plates 76 happen to come into contact with each other during operation.

Figure 6:
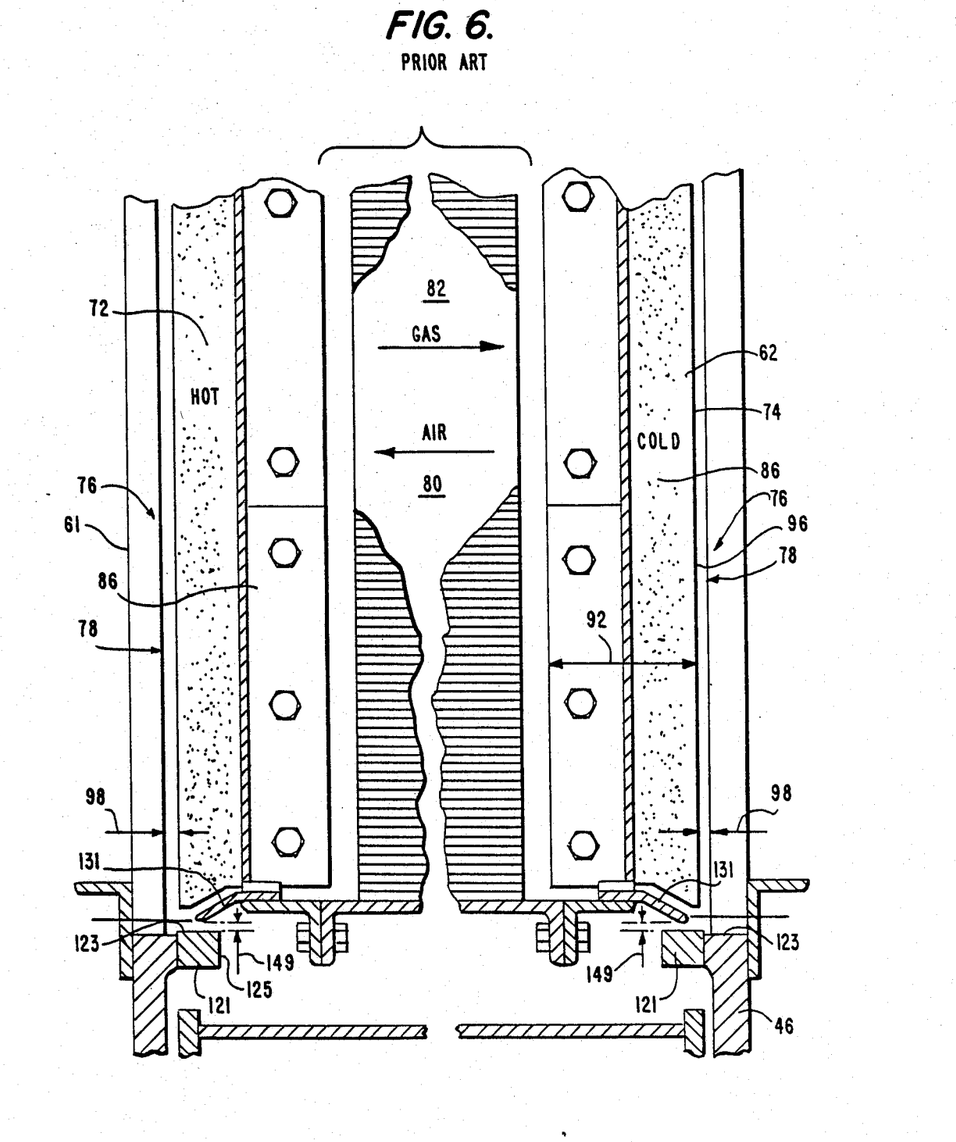
FIG. 6 is a fragmentary sectional view through a known air preheater showing both the radial and circumferential seal plates and the associated sealing surfaces of the housing.

During relative movement between the drum and the housing, the outer radially extending edges 96 of the radial seal plates 86 will normally pass closely by each other. That is, there is normally a small clearance 98 between the outer radially extending edge 96 of radial seal plate 86 and the sealing surface 78 of sector plate 76 (FIG. 6). While in theory, the idea is to maintain a small yet definite clearance 98, in practice, this is not an easy matter. At the hot end of the drum 48, the parts of the air preheater 16 tend to expand which, in turn, can reduce the clearance to zero and cause the seal plates 86 to clash with sector plates 76. Since sector plates 76 are constructed o a generally stiff, semi-rigid metal plate material, this metal-to-metal contact can be quite disadvantageous and can lead to failures. On the other hand, the opposite problem of too much clearance is also frequently experienced in practice. Misalignments, wear, tolerance stackups, and deformation of parts can cause clearance 98 to be considerable at some points in the air preheater, thus causing leakage between the air and gas halves 80, 82 which, in turn, leads to inefficient operation.

These problems are overcome through the use of a set of foil-like metal radial sealing strips 101 coupled to radial seal plates 86 adjacent the outer, radially extending edges 96 of seal plates 86. The radial sealing strips 101 extend along substantially the entire radial lengths 94 of radial seal plates 86 and extend outwardly of seal plates 86 in at least a partially axial direction with respect to drum 48 when the radial sealing strips are not deformed by engagement with the sector plates (such condition being shown in FIGS. 7 and 8). As will be described in more detail hereinafter, the radial sealing strips 101 selectively and yieldingly engage the sector plates 76 (see FIGS. 9-11) to effect sealing between the drum 48 and housing 46 of the air preheater in operation.

It will be apparent that the radial sealing strips 101 are of a substantially thinner material than the radial seal plates 86 and are substantially more flexible than the radial seal plates 86. The radial sealing strips 101 are constructed of a hard, corrosive-resistant, high-alloy material The specific radial sealing strip 101 just described has a thickness of not more than 0.005 inch, while the radial seal plates 86 to which they are attached typically have thicknesses in the range of 0.02 to 0.10 inch. Radial seal plates 86 are approximately 5 to 25 times thicker than the foil-like radial sealing strips 101.

Each radial sealing strip 101 includes a working face or advancing side 103 for selectively engaging the sector plates 76 and a non-working face or trailing side 105 which faces away from the working face 103. Radial sealing strips 101 also include a free distal edge or side edge 107 disposed remotely from the associated radial seal plate 86 when the radial selling strip does not engage a sector plate 76 (i.e., when the sealing strips are in the conditions shown in FIGS. 7 and 8). Opposite free distal edge 107 is an inner side edge 109 adjacent to which radial sealing strips 101 are coupled with their associated radial seal plates 86.

To obtain the proper bending and flexing characteristics for the radial sealing strips 101, a plurality of backing strips or strip portions 111 partially overlie the non-working face 105 of each radial sealing strip or base strip portion 101 to form a stack of strips as shown in FIGS. 7-11. In other words, at least one face of each strip portion is in contiguous face-to-face overlying engagement with a face of at least one other strip portion of the stack. Each backing strip extends from inner side edge 109 of the associated radial sealing strip 101 toward, but not completely to, free distal edge 107 of the radial sealing strip. It is possible, however, that only certain succeeding backing strips in the stack extend toward the free distal edge 107 to a lesser extent than the previous backing strip. For instance, the "steps" formed by the backing strips might be formed by pairs of backing strips 111. Each succeeding backing strip in the stack extends toward free distal edge 107 to a lesser extent than the previous backing strip so that the strips are disposed in a staggered, step-like arrangement. The backing strips are of comparable thickness to the thin foil-like radial sealing strips 101, but may be somewhat thicker. The preferred range of thickness for the backing strips is 0.004–0.010 inch.

Figure 11:
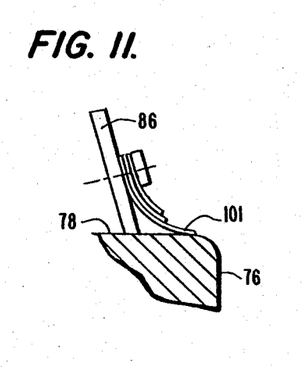

The staggered backing strips 111 affect the bending characteristics of radial sealing strips 101 by increasing their resistance to yielding movement out of the plane of the radial seal plates 86 to which they are attached. Yet, at the same time, the staggered backing strips 111 permit full yielding movement even to the extent where the radial sealing strips 101 will move out from between the clearance 98 between radial seal plate 86 and sector plate 76 if the latter two parts happen to come into contact during operation, as shown in FIG. 11. That is, free distal edge 107 is movable away from the inner side edge 109 when the seal body made up of strips 101 and 111 engages sector plate 76 during operation, such that free distal edge 107 becomes a trailing edge. The direction from the inner side edge 109 to the free distal edge 107 is the trailing direction. The free distal edge is completely unobstructed from yielding movement in a trailing direction, i.e., it has as much freedom of movement in the trailing direction as the flexure characteristics of the seal body made up of strips 101, 111 permits.

The ability of the sealing strips 101 to flex to this extent is important to prevent damage to the radial sealing strips in a condition of minimal clearance or zero clearance as shown in FIG. 11. This notwithstanding, it is important that the sealing strips 101 have a sufficient resistance to yielding movement to prevent differential pressure between the two halves 80, 82 of air preheater 16 from lifting radial sealing strips 101 out of engagement with sector plate 76 when the radial sealing strip 101 is wiping along a sector plate 76 during movement of tee strip from the relatively low pressure gas discharge half 82 toward the relatively high pressure air intake half 80. The flex characteristics given to the radial sealing strips 101 by the use of the staggered backing strips 111 meet these countervailing requirements.

Adjacent the inner side edge 109 of the radial sealing strip are mounts 113 for rigidly and fixedly mounting the seal body (the seal body being composed of the radial sealing strip 101 and, in the particular embodiment shown, backing strips 111) on the radial seal plate 86. Mounts 113 includes bores 115 through the radial sealing strips 101 at their inner side edges. Fasteners 117 (FIG. 9) extend through bores 115 to couple each seal body (i.e., the radial sealing strips) to its associated diaphragm 66 (and specifically to its associated radial seal plate 86 coupled to diaphragm member 60) to extend along one of the radial edges 61 or 62 of a diaphragm member in such position that the radial sealing strip selectively engages certain sector plates during relative movement between the preheater portions to seal the air intake half 80 and gas discharge half 82 of the air preheater with respect to each other.

Figure 9:
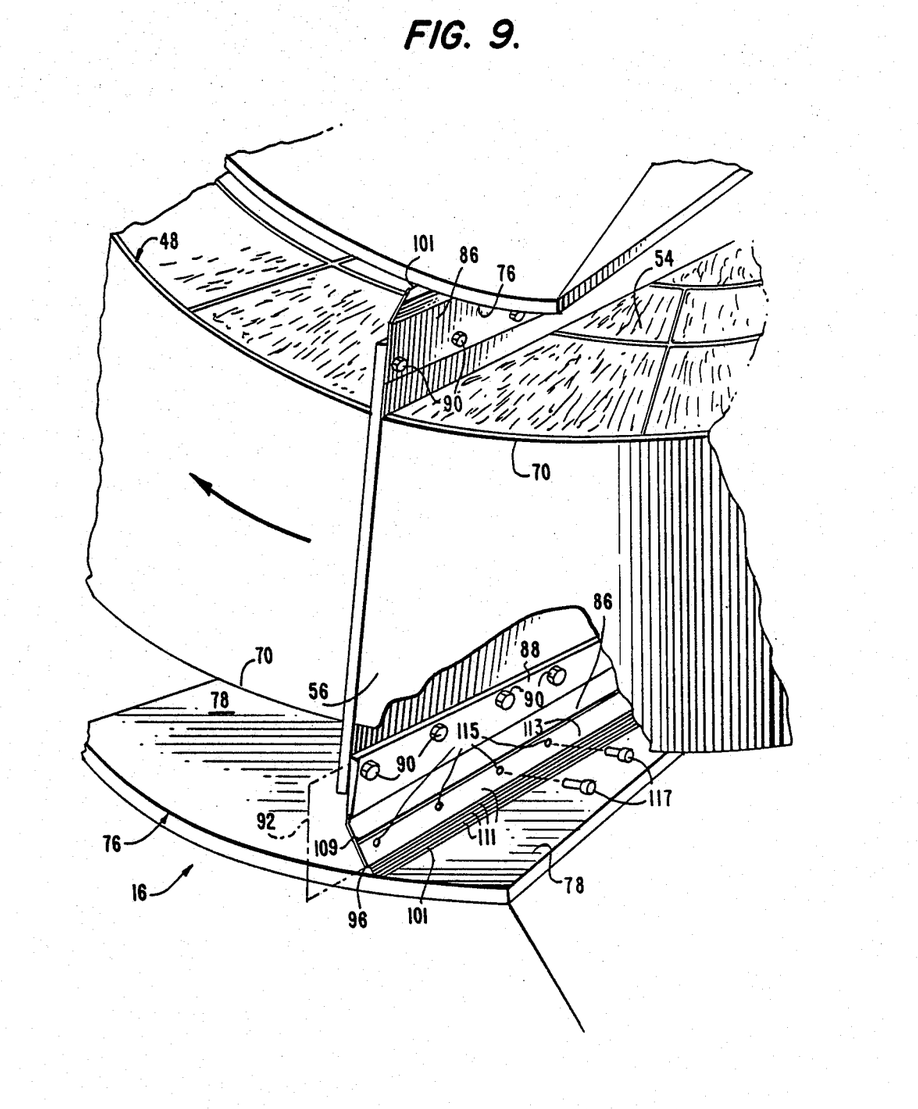
FIG. 9 is a fragmentary isometric view, partly in section, of a radial sealing arrangement according to the present invention.

FIGS. 7 and 8 depict radial sealing strip 101 in its most relaxed condition, i.e., a condition in which the radial sealing strip does not engage the sector plate 76 and in which radial sealing strip 101 is not deformed. As shown in FIG. 9-11, each radial sealing strip 101 is freely, elastically movable into a second elastically deformed condition in response to engagement with the sealing surface 78 of sector plate 76 to effect sealing between the air intake and gas discharge halves or portions of the air preheater. FIG. 9 shows a moderate amount of deformation of strip 101, FIG. 10 shows a medium amount of deformation, and FIG. 11 shows complete deformation, i.e., deformation such that the radial sealing strip 101 no longer extends axially outwardly of the radial seal plate 86. This latter deformation being the result of radial seal plate 86 coming into contact with the sector plate 76. Any one of the conditions of deformation shown in FIGS. 9-11 can be considered a maximum deformation or "most deformed" condition, such condition depending simply upon the particular clearances or lack thereof available in any particular air preheater. It will be apparent that, in any condition, the only part of the sealing strip which is engageable with the radial seal plate 86 is the working face 103 of the base strip portion 101, such that the backing strip portions 111 are isolated from direct engagement with the sector plate by base strip portion 101.

Housing 46 of air preheater 16 includes a pair of annular circumferential members 121 at both the hot and cold ends 40, 42 of the air preheater and disposed adjacent the hot and cold ends 72, 74 of the drum 48. Annular circumferential members 121 each define an annular sealing surface 123 in the housing, annular surfaces 123 being disposed adjacent to the circular edges 70 of the drum. Of course, one of the annular surfaces 123 is disposed adjacent the hot end 72 of the drum, and the other annular surface 123 is disposed adjacent the cold end of drum 48. Annular surface 123 has a cylindrical shape, i.e., it is configured like an inwardly facing surface defined by a cylindrical bore in the particular embodiment shown and described herein. Nevertheless, "annular surface" as used herein is not intended to be limited to this type of cylindrical surface. Rather, the terminology is intended to encompass other ring-like surfaces such as, for instance, a ring-like surface disposed flat in a single plane, such as represented by surface 125 in FIG. 6.

Drum 48 includes a set of semi-rigid circumferential seal plates 131 coupled with both the hot and cold ends 72, 74 of drum 48 adjacent outer circular edges 70 thereof. Each circumferential seal plate 131 includes an inner edge 135 adjacent to which the seal plates 131 are attached to the circular edge 70 of the drum and an outer circumferentially extending edge 137, edge 137 being that edge which is most remote from the drum.

Figure 4:
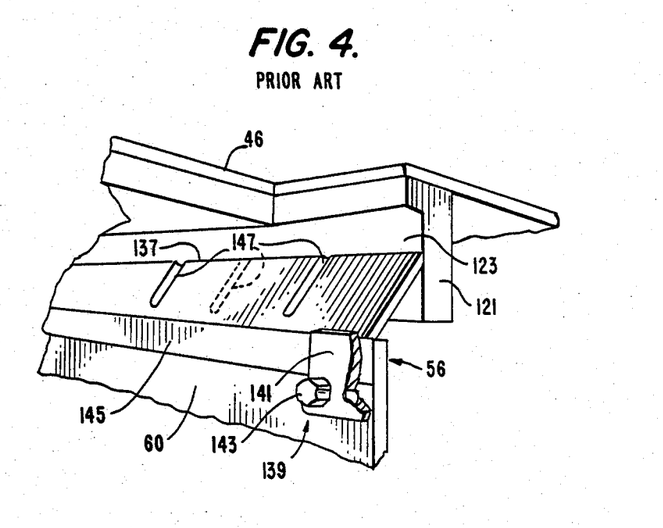
FIG. 4 is a fragmentary isometric view depicting the known circumferential seal plates on the drum and adjacent annular surface of the housing.
Figure 12:
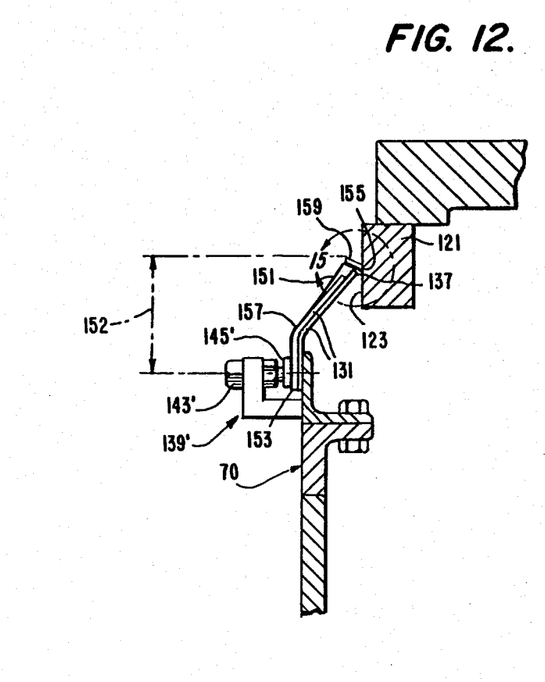
FIG. 12 is a fragmentary view, partly in section, of a circumferential seal arrangement according to the present invention.

Circumferential seal plates 131 are attached to the outer circular edges 70 of drum 48 through the use of clamping devices, one form of which is represented by reference numeral 139 in FIG. 4, and another form of which is represented by reference numeral 139' in FIG. 12. Clamping devices 139, 139' include a seal plate 141 (FIG. 4), 141' (FIG. 9), a set screw and lock nut 143 (FIG. 4), 143' (FIG. 9) and a holding member 145 (FIG. 4), 145' (FIG. 9). Circumferential seal plates 131 may include indentations 147 which allow the plates to be easily deformed to assume a slightly arcuate configuration corresponding to the arc of the circular edges 70 of drum 48. In the place of indentations 147, cut out areas (not shown) corresponding generally in size and configuration to indentations 147 may serve the same purpose. Semi-rigid circumferential seal plates 131 are of such rigidity as to not normally yield during operation of the air preheater but so as to yield to a limited extent should the circumferential seal plates 131 and annular surface 12 of the housing happen to come into contact with each other in operation.

During relative movement between drum 48 and housing 46 (which in the specific embodiment shown and described herein will be a rotary movement of the drum 48 with respect to the stationary housing 46), outer circumferentially extending edge 137 of each circumferential seal plate 131 will normally pass closely by the annular sealing surface 123 of the housing. That is, there is normally a small clearance or gap 149 between the outer edge 137 of the circumferential seal plate 131 and the annular sealing surface 123 of the housing (FIG. 6). As with radial seal plates 86, the idea is to maintain a small yet definite clearance 149. As with the radial seal plates 86 too, maintaining such a clearance or gap 149 is not an easy matter in practice. Again, misalignment, wear, tolerance stackups and deformation of parts are quite common, which often makes gap 149 between the circumferential seal plates and the annular sealing surface 123 variable from no gap at all, causing a metal-to-metal clash, to a very wide gap, such as three-quarters of an inch, causing substantial leakage between the air intake and gas discharge halves 80, 82 of the air preheater 16.

These problems are overcome through the use of a set of flexible circumferential sealing strips 151, each composed of a thin metal foil, specifically, a hard corrosion-resistant, high-alloy foil. Circumferential sealing strips 151 are coupled with the circumferential seal plates 131 adjacent outer edges 137 of seal plates 131. Circumferential sealing strips 151 extend along substantially the entire circumferential distances of circumferential seal plates 131. The widths 152 (FIG. 2) of strips 151 extend in at least a partially radial direction. In this regard, it will be understood that "radial" means a substantial component of radial extension. As will be obvious from FIG. 12, there is also a certain axial component to the extension of circumferential sealing strips 151 in view of the bends and inclines thereof with respect to edge 70 of the drum 48.

Circumferential sealing strips 151 include a basal side edge 153 adjacent to which the strips 151 are mounted with respect to the drum. Each strip 151 also includes a distal side edge 155 opposite to or remote from basal side edge 153. As will be apparent from FIG. 12, circumferential sealing strips 151 are attached to drum 48 adjacent its circular edge 70 by the same clamping device 139' (with support clip 141', set screw and lock nut 143' and holding member 145') as is used for attaching circumferential seal plates 131 to drum 48. In this regard, the areas of the circumferential sealing strips 151 adjacent their basal side edges 153 serve as the mounts for circumferential sealing strips 151 and cooperate with the clamping device 139' to effect mounting. Of course, circumferential sealing strips 151 will be disposed on both sides of the drum at the hot and cold ends 72, 74, to ride over the stationary annular surface 125 as drum 48 rotates with respect thereto (in the particular embodiment shown and described herein). This, in turn, will effect sealing of the air preheater by minimizing leakage around the outer periphery of the drum in a generally axial direction which leakage would, of course, cause the air preheater to operate inefficiently and may include the inner perimeter.

The best circumferential sealing is obtained by providing a basal bend 157 in each circumferential sealing strip 151 adjacent basal side edge 153. Basal bend 157 matches a corresponding bend 158 in circumferential seal plate 131. Bend 158 is disposed adjacent inner edge 135 of seal plate 131 and adjacent the area of connection of seal plates 131 to drum 48. Basal bend 157 and corresponding bend 158 will typically range between about 40° and 70° from a line 160 at the circumference of the drum and parallel to the axis 161 of the drum. Basal bend 157 biases circumferential sealing strip 151 toward engagement with annular surface 123 of the housing 46 of the air preheater 16.

Each circumferential sealing strip 151 also includes a distal bend or sharp bend 159 adjacent distal side edge 155 thereof. The distal bend 159 directs distal side edge 155 toward face-to-face confronting engagement with one of the annular surfaces 123 of housing 46 to effect circumferential sealing. Preferably too, the portion 163 of the circumferential sealing strip 151 extending between the distal bend 159 and the distal edge 155 will be generally transverse to the surface 123. That is, the smaller angle 164 of the two angles formed by the intersection of the plane of the portion 163 with the surface 123 will preferably be greater than 60°, unless the angles are approximately equal, i.e., approximately 90°.

Distal bend 159 is a sharper bend than basal bend 157. Preferably, distal bend 159 will be between 65° and 90°. As will be apparent from FIG. 12 the sharp or distal bend 159 is spaced from but adjacent to distal side edge 155. On the other hand, basal bend 157 is spaced from and remote from both distal bend 159 and distal side edge 155.

Figure 15:
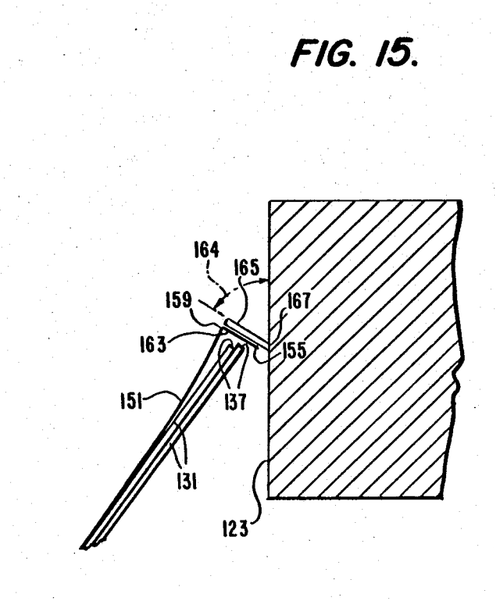
FIG. 15 is an enlarged detailed view, partly in section, of part of the circumferential seal arrangement shown in FIG. 12.

As can best be seen from FIG. 15, distal side edge 155 preferably does not actually engage surface 123. Rather, a flat wear bar 165 is affixed to the circumferential sealing strip 151 adjacent distal edge 155. Specifically wear bar 165 overlies portion 163 of strip 151 and extends therealong in parallel, contiguous relationship thereto for substantially the entire length of strip 151. The largest surfaces of wear bar 165 approximately correspond in their size and shape to portion 163 of circumferential seal strip 151.

It will be seen that the small distal side 167 of wear bar 165, i.e., the side which corresponds generally with distal side edge 155, extends slightly beyond distal side edge 155. Thus, small distal side 167 of wear bar 165 rather than distal side edge 155 of the circumferential sealing strip 151 actually engages the sealing surface 123 in confronting, face-to-face relationship. Because wear bar 165 is substantially thicker than the metal foil of circumferential sealing strip 151 and presents a larger surface area (i.e., that of side 167) to sealing surface 123, it will not cut into sealing surface 123 and will provide longer wear than would be so if the distal edge 155 of the sealing strip 151 were to engage the sealing surface 123 directly.

It will be apparent that the specific features and arrangements of the circumferential seal plate 131 as described herein and shown in the drawings permit each sealing strip to yieldably ride over the annular sealing surface 123 of housing 46 when the drum 48 is moving relative to housing 46. In this regard, the circumferential sealing strips 151 can be considered seal bodies which engage the annular sealing surface 123 and which move in response to irregularities in the sealing surface and irregularities between the drum and housing to effect sealing therebetween.

As with the radial sealing strips 101, circumferential sealing strips 151 are freely elastically movable between a first, most relaxed condition and a second, most elastically deformed condition in response to engagement with a sealing surface of the air preheater to effect sealing between the movable and stationary portions of the air preheater. As with the radial sealing strips, the most relaxed condition and most elastically deformed condition will depend upon the peculiarities of each individual air preheater. Of course, in an air preheater having unusually severe discrepancies in the amount of clearance between the circumferential seal plates 131 and annular surface 123, the first, most relaxed condition and second, most elastically deformed condition will also be extreme.

Figure 14:
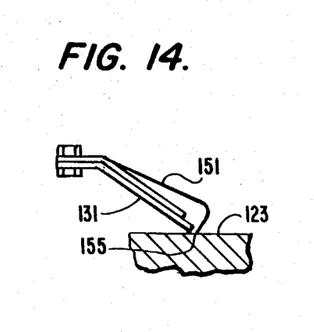

FIG. 12 shows a typical or average condition of flex bias for sealing strip 151. In FIG. 12, there is a clearance between the outer edge 137 of the circumferential seal plate 131, but not an unduly large clearance. In FIG. 13, on the other hand, there is illustrated a very large clearance and a rather extreme condition of movement of strip 151 toward its relaxed condition to accommodate the large gap between the circumferential seal plate 131 and annular sealing surface 123. FIG. 14 illustrates a lack of clearance and a severe condition of bias in a direction toward the most deformed condition of sealing strip 151. The condition shown in FIG. 13 may be considered a "most relaxed" condition for a particular installation although, as already explained, the most relaxed condition will not always be as illustrated in FIG. 13, particularly not in those applications where the clearances remain small. Likewise, FIG. 14 can be considered a "most deformed" condition, although in certain air preheaters the extent of deformation of sealing strip 151 will not be as severe, particularly not where a clearance always remains between the circumferential seal plates and the annular surface 123.

It will be apparent that sealing strip 151 is in a constant condition of bias when it is fixed, adjacent its inner edge 135, with respect to circular edge 70 of the drum of air preheater 16 and when the small distal side 167 of wear bar 165 is thus biased into engagement with annular sealing surface 123 of the housing portion 46 of the air preheater. It will be appreciated that the most relaxed condition of the circumferential sealing strip is that condition where the sealing strip has moved in the direction of bias to its greatest extent toward a fully relaxed condition to accommodate a maximum clearance between the circular edge of the drum (as specifically embodied by the outwardly extending seal plates 131 thereof) and the adjacent annular surface 125. It will also be understood that the most elastically deformed condition is that condition where the sealing strip 151 has moved to the greatest extent counter to the direction of bias to accommodate a minimum clearance between the circular edge of the drum (as embodied by outer edge 137 of circumferential seal plate 131 of the drum 48) and adjacent annular surface 123 of the housing.

The circumferential sealing strips 151 are of roughly comparable thickness to the thin, foil-like radial sealing strips 101, but the circumferential strips will preferably be somewhat thicker. The preferred range of thicknesses for the circumferential sealing strips 151 is 0.010–.020 inch. The circumferential seal plates 131 to which circumferential sealing strips 151 are attached have a thickness and rigidity comparable to that of previously described radial seal plates 86. That is, the circumferential seal plates 131 will typically have thicknesses in the range of 0.06 to 0.10 inch. The circumferential seal plates 131 are approximately 2 to 25 times thicker than the foil-like circumferential sealing strips 151.

It will be seen that the metal foil of both the radial and circumferential sealing strips are free of any surrounding material, with the exception of the wear bar on the circumferential sealing strips. Even where backing strip portions are used in connection with the radial sealing strips, these backing portions are themselves metal foils.

With the arrangement as described herein and shown in the drawings, it will be apparent that provision has been made for sealing an air preheater to minimize leaks both between the intake air and gas discharge sides of the preheater as well as minimizing leaks around the periphery of the drum which contains a matrix of heat exchanging elements. It will also be seen that this is accomplished through a sealing arrangement which accommodates for large variations in the clearances, or lack thereof, between the relatively moving parts of the air preheater and irregularities in such parts, such variations and irregularities being commonly experienced in practice. It will also be seen that the circumferential sealing arrangement of the present invention eliminates any need for an axial sealing arrangement as well. Further, it will be seen that this is accomplished through a simple and economical sealing arrangement which can be installed in commercially available air preheaters without major modification thereto.

Terms such as right and left, upper and lower, above and below, and other relative terms have been used herein. It will be understood that these terms have been used to describe relative relationships only and are not to be construed a limiting. For instance, what is "above" or to the "right" from one frame of reference may be "below" or to the "left" from another frame of reference.

Also, the invention has been described by way of a preferred embodiment thereof, and it will be understood that many variations and modifications are possible. Thus, the invention is not limited by the foregoing description, but rather encompasses many embodiments and variations within the scope of the appended claims.

What is claimed is:

1. A circumferential seal for an air preheater, the air preheater having a housing portion and a drum portion containing a set of heat exchanging elements, the drum portion having oppositely disposed circular edges, the housing portion having pair of annular surfaces disposed adjacent to but not normally engaging the circular edges of the drum so as to form a gap therebetween, said air preheater portions being movable with respect to each other to effect exchange of heat between a gas discharge duct of a fuel burning device and an air intake passage thereof, one of said air preheater portions being for mounting a circumferential seal, the other of said air preheater portions including a sealing surface, the circumferential seal comprising:

(a) an elongated circumferential seal body which has a length, a basal side edge and a distal side edge, said basal and distal side edge extending along said length;

(b) said circumferential seal body being composed of at least one sealing strip of a thin, fluid impermeable flexible metallic material;

(c) said circumferential seal body including means, adjacent said basal side edge, for rigidly and fixedly mounting said circumferential seal body on one of said preheater portions to extend generally between at least one circular edge of the drum portion and at least one annular surface of the housing portion;

(d) said seal body including means for allowing said sealing strip to yieldably ride over the sealing surface of the other of the air preheater portions when the air preheater portions are moving relative to each other during operation of the air preheaters;

(e) said distal side edge of said seal body being a free edge which is disposed opposite said basal side edge;

(f) said sealing strip including a sharp distal bend adjacent to but spaced from said distal side edge of said seal body to direct said distal side edge toward face-to-face confronting engagement with the sealing surface of the air preheater portion other than the air preheater portion on which said circumferential seal body is mounted.

2. A circumferential seal as defined in claim 1, wherein said sealing strip includes a basal bend adjacent said basal side edge of said sealing body to bias said sealing strip into engagement with the annular sealing surface of the housing portion of the air preheater, and wherein said distal bend is spaced from said basal bend.

3. A circumferential sealing arrangement for an air preheater for a fuel burning device, the air preheater including a housing and a drum in the housing, the housing and drum being movable relative to each other, the drum containing heat exchanging elements therein, the drum having a pair of oppositely disposed circular ends defined by circular edges, one end being a cold end into which passes intake air to be preheated and from which passes discharge gas which has been subjected to heat extraction, the other end being a hot end into which passes discharge gas to be subjected to heat extraction and from which passes intake air which has been preheated, the housing of the air preheater having a pair of annular surfaces disposed adjacent to the circular edges of the drum, one of said annular surfaces being disposed on the hot side of the drum, the other annular surface being disposed on the cold side of the drum, the circumferential sealing arrangement comprising:

(a) a set of semi-rigid circumferential seal plates coupled with both the hot and cold ends of the drum adjacent the outer circular edges of the drum, each circumferential seal plate having an outer, generally circumferentially extending edge most remote from the drum, whereby during relative movement between the drum and the housing, the outer circumferentially extending edge of the circumferential seal plate and the annular surface of the housing will normally pass closely by each other, said circumferential seal plates being of such rigidity so as not to normally yield during operation of the air preheater but so as to yield to a limited extent should the circumferential seal plates and the annular surface of the housing happen to come into contact with each other;

(b) a set of flexible circumferential sealing strips coupled to said circumferential seal plates adjacent said outer circumferential edges of said seal plates, said circumferential sealing strips extending along substantially the entire circumferential distances of said circumferential seal plates and extending outwardly of said seal plates in at least a partially radial direction, the circumferential sealing strips being for yielding engagement with the annular surface of the housing to effect sealing between the drum and housing of the air preheater in operation, the circumferential sealing strips being of a substantially thinner material than said circumferential sealing plates and being substantially more flexible than said circumferential sealing plates;

(c) each circumferential sealing strip having a basal side edge adjacent said circumferential seal plate and a distal side edge remote therefrom, said distal side edge being a free edge, each circumferential strip including a sharp, distal bend adjacent to but spaced from said distal side edge of said circumferential sealing strip to direct said distal side edge of said circumferential sealing strip toward face-to-face confronting engagement with the annular surface of the housing.

4. A circumferential sealing arrangement as defined in claim 3, wherein each of said circumferential sealing strips includes a thin, foil-like metal strips.

5. A circumferential sealing arrangement as defined in claim 3, wherein each circumferential sealing strip includes a basal bend adjacent said basal side edge of said sealing body to bias said sealing strip toward engagement with the annular sealing surface of the housing portion of the air preheater, said distal side bend being a second bend spaced from said basal bend.

6. A circumferential sealing arrangement as defined in claim 3, wherein said distal bend of each sealing strip is disposed entirely radially outwardly beyond the circumferential seal plate to which such sealing strip is coupled.

7. An air preheater for a fuel burning device, the air preheater comprising:

(a) a housing;

(b) a drum in said housing, said housing and said drum being movable relative to each other;

(c) a plurality of heat exchanging elements in said drum;

(d) a pair of oppositely disposed circular ends on said drum, said circular ends being defined by circular edges, one of said circular ends being a cold end into which passes intake air to be preheated and from which passes discharge gas which has been subjected to heat extraction in the air preheater, the other circular end being a hot end into which passes discharge gas to be subjected to heat extraction and from which passes intake air which has been preheated;

(e) a pair of annular surfaces in said housing said annular surfaces being disposed adjacent to the circular edges of the drum, one of said annular surfaces being disposed on said hot side of said drum, the other annular surface being disposed on the cold side of the drum;

(f) a set of semi-rigid circumferential seal plates coupled with both the hot and cold ends of the drum adjacent the outer circular edges of the drum, each circumferential seal plate having an outer, generally circumferentially extending edge most remote from the drum, whereby, during relative movement between the drum and the housing, the outer circumferential extending edge of the circumferential seal plate and the annular surface of the housing will normally pass closely by each other, said circumferential seal plates being of such rigidity so as not to normally yield during operation of the air preheater but so as to yield to a limited extent should the circumferential seal plates and the annular surface of the housing happen to come into contact with each other;

(g) a set of flexible circumferential sealing strips coupled to said circumferential seal plates adjacent said outer circumferential edges of said seal plates, said circumferential sealing strips extending along substantially the entire circumferential distances of said circumferential seal plates and extending outwardly of said seal plates in at least a partially radial direction, the circumferential sealing strips being for yielding engagement with the annular surfaces of the housing to effect sealing between the drum and housing of the air preheater in operation, the circumferential sealing strips being of a substantially thinner material than said circumferential sealing plates and being substantially more flexible than said circumferential sealing plates;

(h) each circumferential sealing strip having a basal side edge adjacent said circumferential seal plate and a distal side edge remote therefrom, the distal side edge being a free edge, each circumferential strip including a sharp, distal bend adjacent to but spaced from said distal side edge of said circumferential sealing strip to direct said distal side edge of said circumferential sealing strip toward face-to-face confronting engagement with the annular surface of the housing.

8. An air preheater as defined in claim 7, wherein each of said circumferential sealing strips includes a thin, foil-like metal strip.

9. An air preheater as defined in claim 7, wherein each circumferential sealing strip includes a basal bend adjacent to but spaced from said first side edge of said circumferential sealing strip to bias said sealing strip toward engagement with the annular surface of the housing of the air preheater, said distal bend being a second bend spaced from said basal bend.

10. An air preheater as defined in claim 9, wherein said distal bend of each sealing strip is disposed entirely radially outwardly beyond the circumferentially seal plate to which such sealing strip is coupled.

11. An air preheater for a fuel burning device, the air preheater comprising:
 (a) a housing;
 (b) a drum in the housing, the housing and drum being movable relative to each other;
 (c) sets of heat exchanging elements in the drum;
 (d) a plurality of radially extending diaphragm members which divide the drum into sectors, each sector containing a set of said heat exchanging elements;
 (e) a pair of oppositely disposed circular ends on said drum defined by circular edges, one end being a cold end into which passes intake air, which intake air is to be preheated and from which end passes discharge gas, which discharge gas has been subject to heat extraction, the other end being a hot end into which passes discharge gas to be subjected to heat extraction and from which passes intake air which has been preheated;
 (f) a plurality of sector plates in said housing, which sector plates divide said housing into an air intake half and a gas discharge half, one pair of sector plates being disposed adjacent to said hot end of said drum in face-to-face relationship with said hot end, another pair of sector plates being disposed adjacent said cold end of said drum in face-to-face relationship with said cold end, each sector plate corresponding generally to a sector of the drum;
 (g) a pair of annular surfaces in said housing, said annular surfaces being disposed adjacent to the circular edges of the drum, one of said annular surfaces being disposed on said hot end of said drum, the other annular surface being disposed on said cold end of said drum;
 (h) a set of semi-rigid radial seal plates coupled with the diaphragm members and extending lengthwise therealong to provide a set of radially extending seal plates at both the hot and cold ends of the drum, each radial seal plate having a width extending normal to its length, the radial seal plates also extending generally axially from the drum in the direction of their widths, each radial seal plate having an outer radially extending edge most remote from the drum, whereby during relative movement between the drum and the housing, the outer radially extending edges of the radial seal plates will normally pass closely by said sector plates, said radial seal plates being of such rigidity so as not to normally yield during operation of the air preheater but so as to yield to a limited extent should the radial seal plates and sector plates happen to come into contact with each other;
 (i) a set of foil-like metal radial sealing strips coupled to said radial seal plates adjacent said outer radially extending edges of said seal plates, said radial sealing strips extending along substantially the entire radial lengths of said radial seal plates and extending outwardly of said seal plates in at least a partially axial direction with respect to the drum when the radial sealing strips are not deformed by engagement with the sector plates, the radial sealing strips selectively and yieldingly engaging the sector plates to effect sealing between the drum and housing of the air preheater in operation, the radial sealing strips being of a substantially thinner material than said radial seal plates and being substantially more flexible than said radial seal plates;
 (j) said radial sealing plates being completely unobstructed from cantilevered yielding movement in a direction accommodating yielding engagement with the sector plates to the full extent that the flexure characteristics of the radial sealing strips themselves permit;
 (k) a set of semi-rigid circumferential seal plates coupled with both the hot and cold ends of the drum adjacent the outer circular edges of the drum, each circumferential seal plate having an outer circumferentially extending edge most remote from the drum, whereby, during relative movement between the drum and the housing, the outer circumferentially extending edge of the circumferential seal plate and the annular surface of the housing will normally pass closely by each other, said circumferential seal plates being of such rigidity so as not to normally yield during operation of the air preheater but so as to yield to a limited extent should the circumferential seal plates and the annular surface of the housing happen to come into contact with each other;

(l) a set of flexible circumferential sealing strips coupled to said circumferential seal plates adjacent said outer circumferential edges of said seal plates, said circumferential sealing strips extending along substantially the entire circumferential distances of said circumferential seal plates and extending outwardly of said seal plates in at least a partially radial direction, the circumferential sealing strips yieldingly engaging the annular surfaces of the housing to effect sealing between the drum and housing of the air preheater in operation, the circumferential sealing strips being of a substantially thinner material than said circumferential sealing plates and being substantially more flexible than said circumferential sealing plates;

(m) each circumferential sealing strip having a basal side edge adjacent said circumferential seal plate and a distal side edge remote therefrom, the distal side edge being a free edge, each circumferential strip including a sharp, distal bend adjacent to but spaced from said distal side edge of said circumferential sealing strip to direct said distal side edge of each said sealing strip toward face-to-face confronting engagement with one of said annular surfaces of said housing.

12. An air preheater as defined in claim 11, wherein each radial sealing strip includes:

(a) a base strip portion having a first face for selectively engaging the sector plates and a second face which faces away from said first face and a free distal edge disposed remotely from the associated radial seal plate when the radial sealing strip does not engage said sector plate, (b) a plurality of backing strip portions partially overlying said second face of each base strip portion to form a stack of strip portions, each backing strip portion extending toward, but not completely to, said free distal edge of said base strip portion, certain succeeding backing strip portions in the stack extending toward said free distal edge to a lesser extent than the previous backing strip portion so that said strip portions are disposed in a staggered, step-like arrangement.

13. An air preheater as defined in claim 11, wherein each of said circumferential sealing strips includes a thin, foil-like metal strip.

14. An air preheater as defined in claim 11, wherein each circumferential sealing strip includes a basal bend adjacent said basal side edge of said circumferential sealing strip to bias said circumferential sealing strip toward engagement with the annular surface of the housing of the air preheater, said distal bend being a second bend spaced from said first bend.

15. An air preheater as defined in claim 11, wherein said distal bend of each sealing strip is disposed entirely radially outwardly beyond the circumferential seal plate to which such sealing strip is coupled.

16. A circumferential seal for an air preheater, the air preheater having a housing portion and a drum portion containing a set of heat exchanging elements, the drum portion having oppositely disposed circular edges, the housing portion having a pair of annular surfaces disposed adjacent to but not normally engaging the circular edges of the drum so as to form a gap therebetween, said air preheater portions being movable with respect to each other to effect exchange of heat between a gas discharge duct of a fuel burning device and an air intake passage thereof, one of said air preheater portions being for mounting a circumferential seal, the other of said air preheater portions including a sealing surface, the circumferential seal comprising:

(a) an elongated circumferential seal body which has a length, a basal side edge and a distal side edge, said basal and distal side edges extending along said length;

(b) said circumferential seal body being composed of at least one sealing strip of a thin, fluid impermeable flexible metallic material;

(c) said circumferential seal body including means, adjacent said basal side edge, for rigidly and fixedly mounting said circumferential seal body on one of said preheater portions to extend generally between at least one circular edge of the drum portion and at least one annular surface of the housing portion;

(d) said seal body including means for allowing said sealing strip to yieldably ride over the sealing surface of the other of the air preheater portions when the air preheater portions are moving relative to each other during operation of the air preheaters;

(e) said distal side edge of said seal body being a free edge which is disposed opposite said basal side edge;

(f) said sealing strip including a sharp distal bend adjacent to but spaced from said distal side edge of said seal body to create a distal portion of said sealing strip, which distal portion extends from said distal bend to said distal side edge, said distal portion being disposed generally transverse to the sealing surface of the air preheater portion other than the air preheater portion on which said circumferential seal body is mounted.

* * * * *